United States Patent [19]

Nakamura

[11] Patent Number: 5,665,282
[45] Date of Patent: Sep. 9, 1997

[54] INJECTION MOLDING METHOD OF AN INJECTION MOLDING MACHINE

[75] Inventor: Nobuyuki Nakamura, Nagano, Japan

[73] Assignee: Nissei Plastic Industrial Co., Ltd., Nagano-ken, Japan

[21] Appl. No.: 501,541

[22] Filed: Jul. 12, 1995

[30] Foreign Application Priority Data

Jul. 20, 1994 [JP] Japan .................. 6-190982

[51] Int. Cl.$^6$ ..................... B29C 45/76; B29C 45/77
[52] U.S. Cl. .............. 264/40.1; 264/40.4; 264/328.1; 264/40.5; 425/147; 425/149; 425/586
[58] Field of Search .................. 264/40.1, 40.4, 264/40.5, 40.7, 328.1, 328.17; 425/145, 147, 150, 557, 558, 586, 587, 166, 149

[56] References Cited

U.S. PATENT DOCUMENTS

| | | | |
|---|---|---|---|
| 3,666,141 | 5/1972 | Ma et al. | 425/145 |
| 4,311,446 | 1/1982 | Hold et al. | 425/145 |
| 5,002,717 | 3/1991 | Taniguchi | 264/328.1 |
| 5,110,522 | 5/1992 | Inaba et al. | 264/40.5 |
| 5,260,010 | 11/1993 | Yokota | 264/40.5 |
| 5,470,514 | 11/1995 | Dray | 264/328.1 |

FOREIGN PATENT DOCUMENTS

| | | |
|---|---|---|
| 63-209918 | 8/1988 | Japan . |
| 3-221427 | 9/1991 | Japan . |

*Primary Examiner*—Jill L. Heitbrink
*Attorney, Agent, or Firm*—Birch Stewart Kolasch & Birch, LLP

[57] ABSTRACT

When molding is carried out by injecting and charging a measured resin into a mold by a pushing-out member, a measured value of a stroke length of the pushing-out member is calculated and set in advance when the pushing-out member is advanced up to the maximum forward position. The stroke of the pushing-out member is measured from the maximum forward position based on the measured value at a time of a measuring. The pushing-out member is advanced from a measuring completion position to the maximum forward position and then the injecting is carried out. Accordingly, a pressure retaining process becomes unnecessary for reserving a cushion amount and controlling a pressure, and also the resin is charged into the mold based on an always constant molten time. Therefore, a molding product can be made uniform.

12 Claims, 5 Drawing Sheets

INJECTION MOLDING METHOD OF AN INJECTION MOLDING MACHINE

BACKGROUND OF THE INVENTION

1. Field of the Invention

The present invention relates to an injection molding method of an injection molding machine for molding by injecting and charging a measured resin into a mold by means of a pushing-out member.

2. Description of the Relevant Art

Until now, an injection molding machine, for example, an in-line screw type of the injection molding machine is known in the official gazette of Japanese Patent Application Laid-Open No. 63 (1988)—209918, and an injecting molding method using this type of the injection molding machine is known in the official gazette of Japanese Patent Application Laying-Open No. 3 (1991)—221427.

According to this injection molding method, at first, a resin is measured in a measuring process. In the measuring process, a molding material supplied by a hopper disposed at a rear portion of a barrel cylinder is platicized and molten by a rotation of a screw, and is stored (measured) before the screw. On the other hand, after the measuring process is finished, it is shifted to an injecting process. In the injecting process, the screw is advanced based on a speed control, and a measured resin is injected and charged into a mold, and also after the charging is finished, that is, when it reaches a speed-pressure switching position (V-P switching position), it is shifted to a pressure retaining process. Then, in the pressure retaining process, a predetermined pressure retaining force is given for a charged resin within the mold based on the pressure control.

However, in such a prior injection molding method, there are the following problems because it needs at least a measuring process, an injecting process and a pressure retaining process.

First, it includes the pressure retaining process associated with a pressure control. Therefore, it needs to reserve a cushion amount by leaving a resin before a screw after the charging of the resin to the mold is finished. Thereby a residue resin and a new resin which are different in a melting time are mixed in the resin charged in the mold before and after. Accordingly, this results in a variation and a quality reduction of a molding product.

Second, it includes the pressure retaining process. Therefore, it needs a pressure control valve, a control circuit and the like which are used to control a pressure retaining operation. Also, in a V-P switching position at which it is switched from the injecting process in which the speed control is carried out, to the pressure retaining process in which the pressure control is carried out, an overshoot associated with a feedback control is generated. Therefore, it needs a complicated control circuit for ensuring stability and smoothness of the control. As a result, the control system is, expensive and large.

SUMMARY OF THE INVENTION

It is therefore an object of the present invention to provide an injection molding method of an injection molding machine that can make a molding product uniform and high quality by making it unnecessary to ensure a cushion amount and charging a resin into a mold based on an always constant molten time.

Another object of the present invention is to provide an injection molding method of an injection molding machine that can make a control system inexpensive and small by eliminating the need for pressure retaining process and a V-P switching process which require a pressure control.

A still further object of the present invention is to provide an injection molding method of an injection molding machine that can make mass productivity high by shortening a time of a molding cycle.

To attain these objects, according to the present invention, at a time of carrying out a molding by injecting and charging a measured resin into a mold M by means of a pushing-out member 2, a measured value S of a resin at a time when a predetermined target resin pressure Pr is generated is calculated and set in advance when the pushing-out member 2 is advanced up to the maximum forward position Xf. The measured value S includes a back pressure measuring stroke Sm at which a constant back pressure Pm is applied to the pushing-out member 2 and the measuring is carried out, and a decompressing stroke So at which the pushing-out member is retreated from the back pressure measuring stroke Sm and a decompressing is carried out. The back pressure measuring stroke Sm and the decompressing So can be calculated by using a known physical amount and an equation. Incidentally, the pushing-out member 2 can be applied to an injection plunger 11 in a preplasticating injection molding machine 1a, or a screw 51 in an in-line screw type of an injection molding machine 1b.

And, at a time of a measuring, the pushing-out member 2 is measured from the maximum forward position Xf based on the measured value S. In this case, at first, the constant pressure Pm is applied to the pushing-out member 2, and the back pressure measuring stroke Sm is measured from the maximum forward position Xf. Next, the decompressing is carried out in such a manner that the pushing-out member 2 is retreated further by the decompressing stroke So from a position at which the back pressure measuring stroke Sm is measured. As a result, the position of the pushing-out member 2, which is retreated by an amount corresponding to the decompressing stroke So, becomes a final measuring completion position Xe.

On the other hand, at a time of an injecting, the injecting is carried out in such a manner that the pushing-out member 2 is advanced from the measuring completion position Xe to the maximum forward position Xf. That is, the pushing-out member 2 is pushed out from the measuring completion position Xe to the maximum forward position Xf. As a result, a total resin amount based on the measured value S is injected and charged into the mold M, and also after the injecting, a predetermined target resin pressure Pr is applied to the resin in the mold M. Incidentally, the pushing-out member 2 is on a stoppage condition at the maximum forward position Xf after the injecting is finished.

Accordingly, there is no need for a pressure retaining process in which a pressure control is required, and also the reservation of a cushion amount becomes unnecessary. Further, the resin is charged into the mold M based on an always constant melting time. Therefore, a molding product can be made uniform.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Optimum embodiments according to the present invention will be listed and explained hereinafter with reference to the drawings.

FIGS. 1 to 4 show a screw preplasticating injection molding machine 1a.

First, the construction of the screw preplasticating type of injection molding machine 1a will be explained with reference to FIG. 2.

Figure 2:
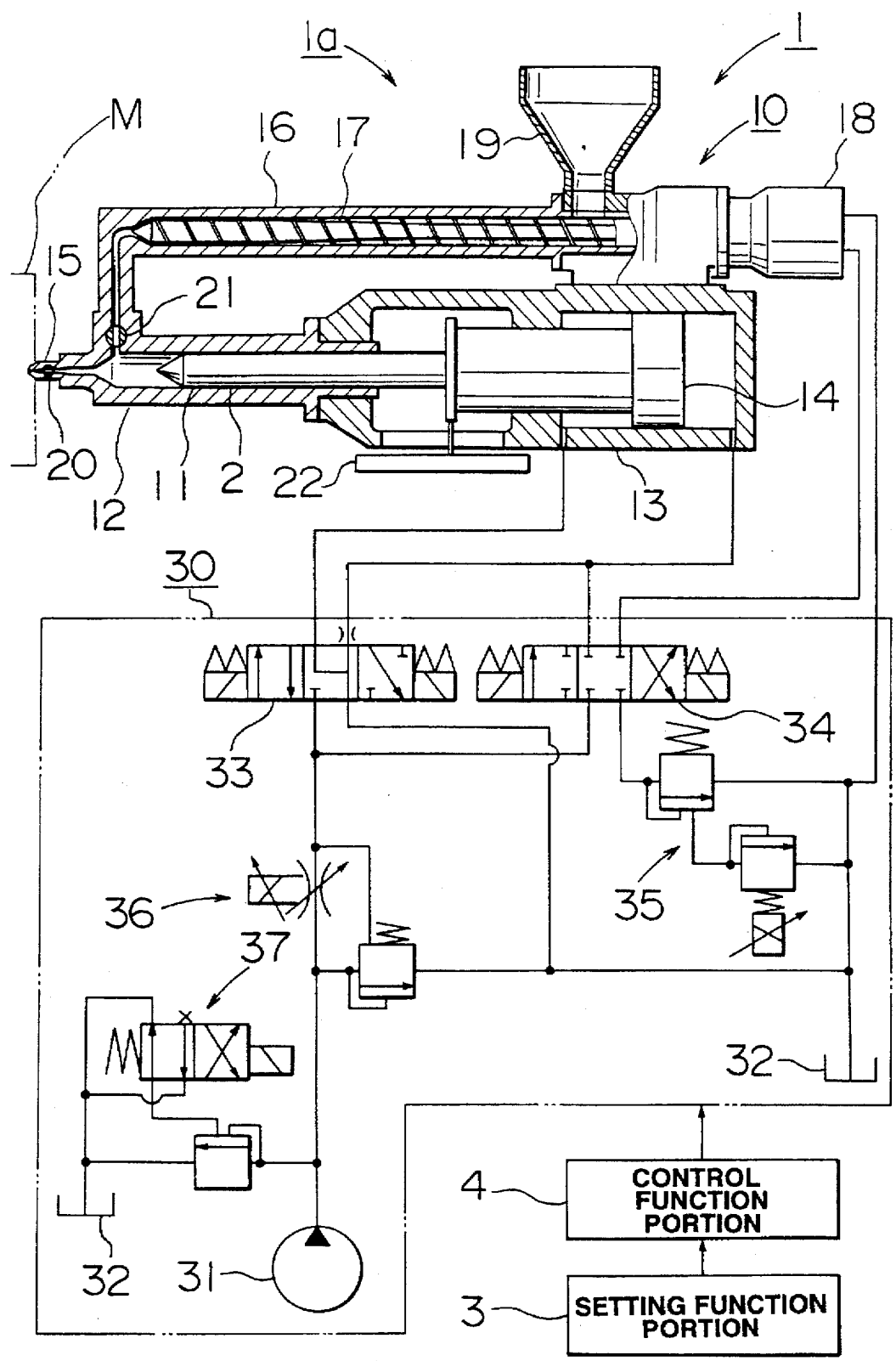
FIG. 2 is a view of a preplasticating injection molding machine wherein the same injection molding method can be performed.

In FIG. 2, reference numeral 10 shows an injection equipment. The injection equipment 10 is provided with an injection barrel cylinder 12 with a built-in injection plunger 11 constituting a pushing-out member 2. A rear end of the injection barrel cylinder 12 is combined with a front end of an injection cylinder 13. An injection ram 14 is built in the injection cylinder 13. The rear end of the injection plunger 11 is combined with the injection ram 14. Further, the front end of the injection barrel cylinder 12 is provided with an injection nozzle 15. A leading end of the injection nozzle 15 is abutted against a mold M.

A preplasticating cylinder 16 for supplying a molten resin to the injection barrel cylinder 12 is disposed above the injection barrel cylinder 12. The preplasticating cylinder 12 with a built-in a screw 17 is rotated by an oil motor 18 disposed at the rear end of the preplasticating cylinder 16. Incidentally, reference numeral 19 denotes a hopper for supplying a molding material, 20 is an opening/closing valve on a side of the injection nozzle 15, 21 is an opening/closing valve on a side of the preplasticating cylinder 16, and 22 is a position sensor for detecting a position of the injection plunger 11.

On the other hand, reference numeral 30 shows a hydraulic oil supplying circuit connected to the injection cylinder 13 and the oil motor 18. In the hydraulic oil supplying circuit 30, reference numeral 31 denotes a hydraulic oil pump, 32 is an oil tank, 33 and 34 are four-ports direction switching valves, 35 is a back pressure controlling circuit for applying a constant back pressure of Pm to the injection plunger 11, 36 is a flow rate controlling circuit for controlling a forward speed of the injection plunger 11, and 37 is a load/unload switching circuit, respectively. Therefore, there is not a pressure retaining circuit for performing a pressure retaining control in the hydraulic oil supplying circuit 30.

Further, reference numeral 3 denotes a setting function portion, which has a function of setting a measured value S of a resin in a case where a predetermined target resin pressure Pr is generated when the injection plunger 11 is advanced up to the maximum forward position Xf (pushing-out position). Furthermore, reference numeral 4 denotes a control function portion, which has various control functions for performing the injection molding method according to the present invention.

The injection molding method according to the present invention as well as an operation of the screw preplasticating type of the injection molding machine 1a will be explained hereinafter with reference to FIGS. 1 to 5.

At first, in advance, the setting function portion 3 calculates and sets the measured value S in a case where the predetermined target resin pressure Pr is generated when the injection plunger 11 is advanced up to the maximum forward position Xf. The measured value S includes a back pressure measuring stroke Sm at which the constant back pressure Pm is applied to the injection plunger 11 and a measuring is carried out, and a decompressing stroke So at which the injection plunger 11 is retreated from the back pressure measuring stroke Sm and a decompressing is carried out.

The back pressure measuring stroke Sm can be calculated by means of an equation of $Sm=(4 \cdot v_1 \cdot V)/(\pi \cdot do^2 \cdot v_2)$ (where $v_1$, is a resin specific volume when the back pressure Pm is applied, V is a capacity of a mold cavity, do is a diameter of the injection plunger, and $v_2$ is the resin specific volume at a time when a target resin pressure Pr is generated). On the other hand, a state equation is represented by $(P+\pi) \cdot (v-\omega)=Rm \cdot T$ (where P is the resin pressure, v is the resin specific volume, T is a resin temperature and $\pi$ and $\omega$ and Rm are constants associated with the resin pressure, the resin specific volume and the resin temperature, respectively). Therefore, the resin specific volumes $v_1$ and $v_2$ in the previous equation can be calculated from the state equation.

Further, the decompressing stroke So for carrying out the decompression can be calculated from $So=((v_0/v_1)-1) \cdot Sm$ (where $v_0$ is the resin specific volume at a time of a zero pressure).

Then, a stroke into which the back pressure measuring stroke Sm and the decompressing stroke So are added, that is (Sm+So) is the measured value S (injection stroke) in the present invention.

Figure 3:
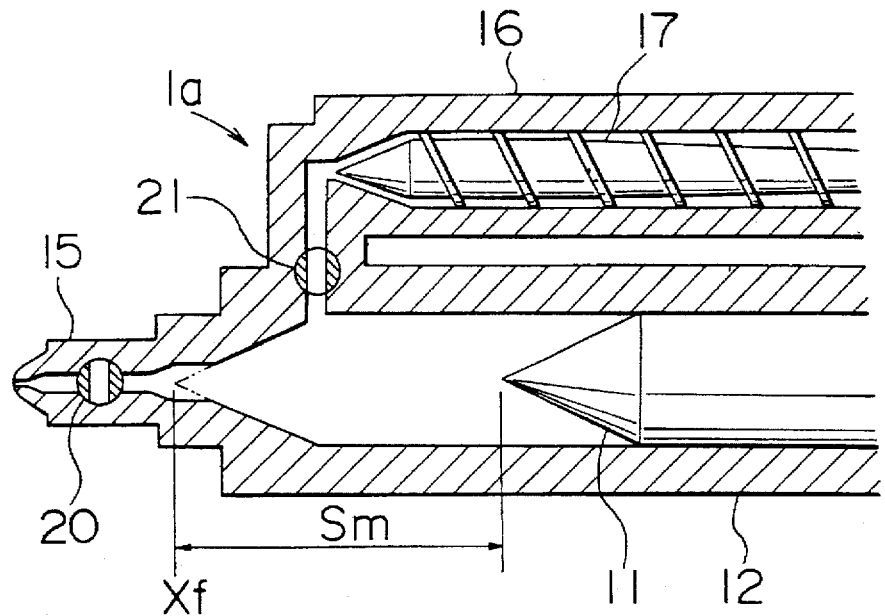
FIG. 3 is another operation explanatory drawing for explaining the same injection molding method.

On the other hand, the control function portion 4 carries out the following control at a time of the molding. At first, the opening/closing valve 20 on the side of the injection nozzle 15 is closed, and the opening/closing valve 21 on the side of the preplasticating cylinder 16 is opened, in a measuring process, as shown in FIG. 3. Further, on this occasion, the injection plunger 11 stops at the maximum forward position Xf, that is, the position where the injection plunger 11 is finished to be pushed out.

Figure 1:
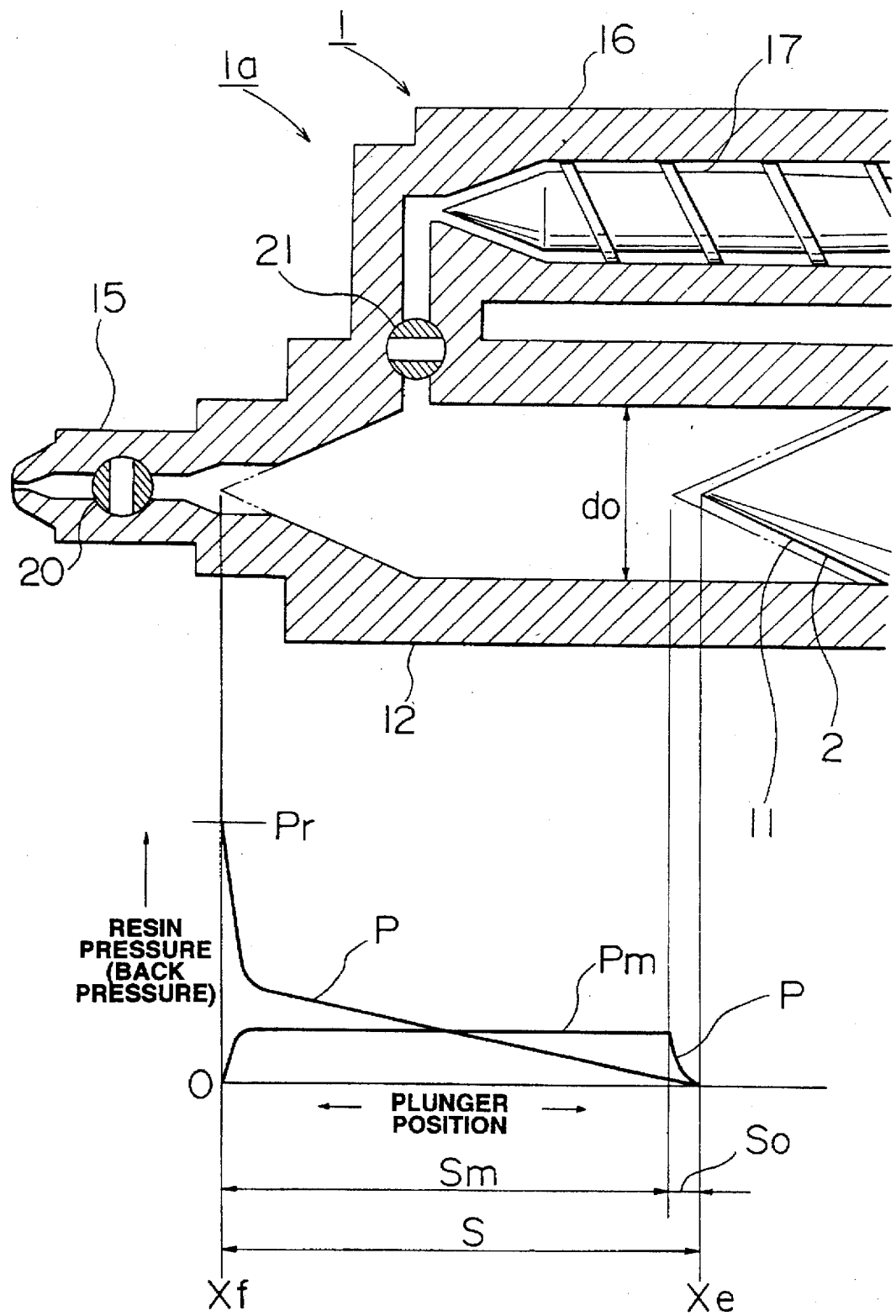
FIG. 1 is an operation explanatory view for explaining an injection molding method according to the present invention.

Then, the measuring is carried out, based on the measured value S set by the setting function portion 3. At a time of the measuring, a rotation of the screw 17 causes the molding material supplied from the hopper 19 to be platicized and molten. This platicized and molten resin is supplied to the injection barrel cylinder 12. As a result, the injection plunger 11 to which the constant back pressure Pm is applied is retreated, as shown in FIG. 1. Accordingly, after an amount of the back pressure measuring stroke Sm is measured, a supplying of the resin to the injection barrel cylinder 12 is stopped, and the opening/closing valve 21 of the preplasticating cylinder 16 is closed (Refer to FIG. 1.).

Also, the decompression is carried out by furthermore retreating the injection plunger 11 from a measuring completion position corresponding to the amount of the back pressure measuring stroke Sm by the amount of the decompressing stroke So. As a result, the resin pressure P becomes zero as shown in FIG. 1. Not only the stroke into which the back pressure measuring stroke Sm and the decompressing stoke So are added becomes the injection stroke (measured value S), but also the injection plunger 11 is positioning-controlled and stopped at the measuring completion position Xe.

Figure 4:
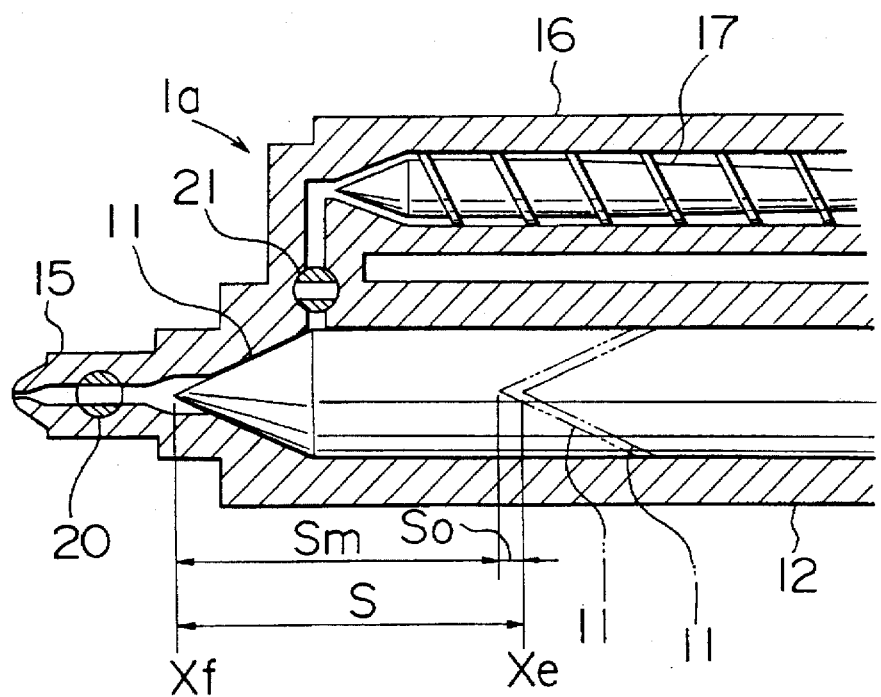
FIG. 4 is the other operation explanatory drawing for explaining the same injection molding method.

Next, it is shifted to an injecting process. In the injecting process, as shown in FIG. 4, the injection is carried out in such a manner that the opening/closing valve 20 on the side of the injection nozzle 15 is opened and that the injection plunger 11 is advanced from the measuring completion position Xe to the maximum forward position Xf. That is, the injection plunger 11 is pushed out from the measuring completion position Xe to the maximum forward position Xf. As a result, a total resin amount in the injection barrel cylinder 12 based on the measured value S is injected and charged into the mold M. And, on this occasion, as shown in FIG. 1, the resin pressure P within a cavity of the mold M is increased gradually, and becomes the target resin pressure Pr finally.

By the way, the resin in the mold M is solidified gradually with a time elapsed, and its specific volume becomes small. As a result, the resin pressure P is lowered with the time elapsed. For this reason, it is desirable to complete an injection charging as soon as possible. For example, an injection speed of the injection plunger 11 is set in such a manner that an injection charging time is within 0.3 second. In the injection molding method according to the present invention, the injection plunger 11 is pushed out up to the maximum forward position Xf. Thereby, the injection speed can be easily made fast. Incidentally, in a case where the injection speed cannot be made fast according to a kind of molding material and the like, since there is included a temperature variable in the state equation, it is possible to calculate the measured value S in which a temperature deviation is considered.

Figure 5:
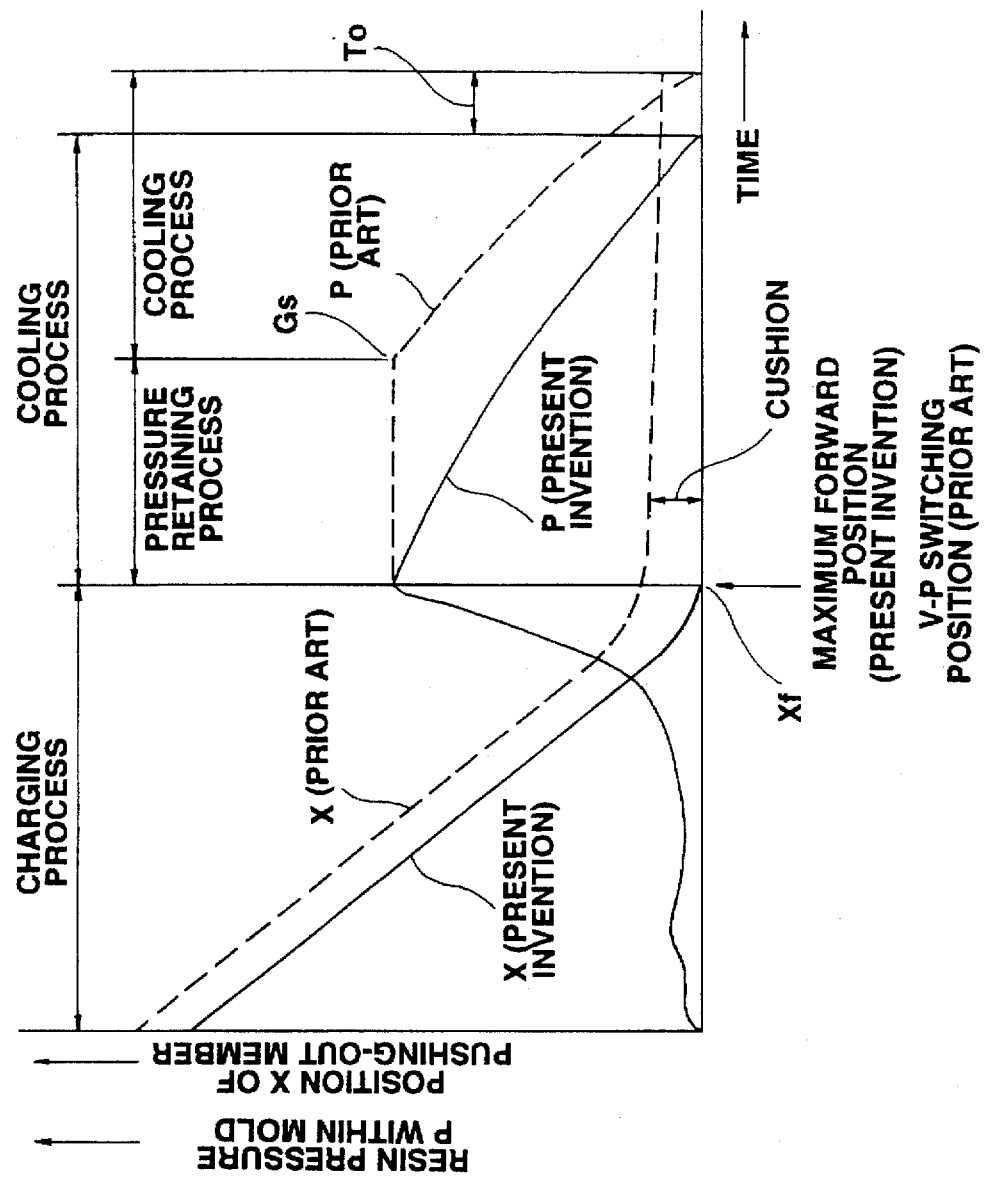
FIG. 5 is a graph showing a screw position and a resin pressure within a mold with respect to an elapsed time at a time of a molding.

FIG. 5 shows a variation characteristic of a position X of the pushing-out member 2 and the resin pressure P within the mold M with respect to the elapsed time at a time of the molding. In the drawing, a dotted line indicates a characteristic curve according to a prior art, and a solid line indicates the characteristic curve according to an inventive method, respectively. As can be seen evidently from the drawing, a prior method switches to a pressure control at a V-P switching position, and also performs a pressure retaining process up to a Gs point in which a gate sealing is carried out, and after that, it is shifted to a cooling process. On the other hand, in this inventive method, the pushing-out member 2 is stopped (fixed) at the maximum forward position Xf. Therefore, the pressure retaining process necessary for the pressure control is omitted, and also it is shifted automatically to the cooling process when the pushing-out member 2 reaches the maximum forward position Xf. Thereby, a V-P switching control is not necessary. As a result, it is possible to make the control system inexpensive and small. Further, accordingly, in the inventive method, a molding cycle time becomes shorter by a time shown at To in the drawing as compared with the prior method, so that mass productivity can be improved. Furthermore, in the inventive method, it becomes unnecessary to reserve a cushion amount, and the resin is charged into the mold M based on an always constant molten time. Thereby, a molding product can be made uniform and high quality.

Figure 6:
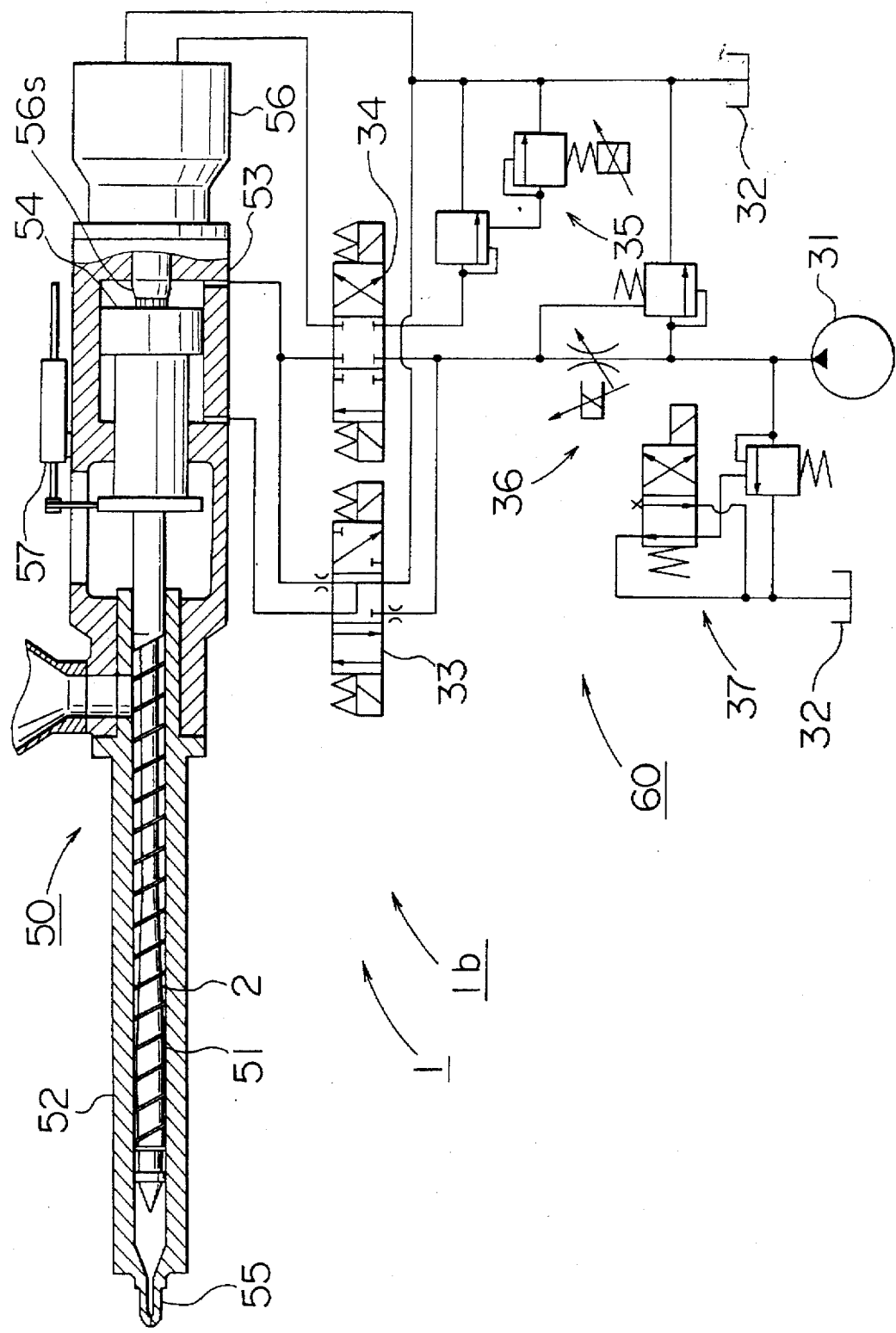
FIG. 6 is a view of an in-line screw type of an injection molding machine wherein the same injection molding method can be performed.

Next, there is shown a case that an in-line screw type of an injection molding machine is used. FIG. 6 shows the in-line screw type of the injection molding machine 1b.

In FIG. 6, reference numeral 50 denotes an injection equipment. The injection equipment 50 is provided with a barrel cylinder 52 having a built-in screw 51 constituting the pushing-out member 2. A rear end of the barrel cylinder 52 is combined with a front end of an injection cylinder 53. And, an injection ram 54 is built in the injection cylinder 53. The rear end of a screw 51 is combined with the injection ram 54. Further, the front end of the barrel cylinder 52 is provided with an injection nozzle 55. A leading end of the injection nozzle 55 is in contact with a mold (not shown). Further, the rear end of the injection cylinder 53 is provided with an oil motor 56. A rotational shaft 56s of the oil motor 56 is spline-combined with the rear end of the injection ram 54. Moreover, reference numeral 57 denotes a position sensor for detecting a position of the screw 51. On the other hand, reference numeral 60 denotes a hydraulic pressure supplying circuit connected to the injection cylinder 53 and the oil motor 56. Incidentally, in the hydraulic pressure supplying circuit 60, the same symbol is applied to the same function portion in FIG. 2, and its construction is made evident, and also its detail explanation is omitted. Also, constructions shown in FIG. 6 have function portions similar to the setting function portion 3 and the control function portion 4 shown in FIG. 2. However, an illustration thereof is omitted.

Accordingly, also in case of the in-line screw type of the injection molding machine 16, in the measuring process, the screw 51 is stopped at the maximum forward position, that is, the pushing-out position, and the screw 51 is rotated. Thereby, the measuring is carried out based on the back pressure measuring stroke Sm set by the setting function portion 3 (Refer to FIG. 2 .). Also, after the measuring is finished, the screw 51 is stopped at the measuring completion position Xe where it is retreated by the amount corresponding to the decompressing stroke So. After that, in the injecting process, the injection is carried out in such a manner that the screw 51 is advanced from the measuring completion position Xe up to the maximum forward position Xf. Basically, it can be carried out similarly to the case of the screw preplasticating type of the injection molding machine 1a mentioned above.

As mentioned above, although the embodiments have been explained in detail, the present invention is not limited those embodiments, and various modifications and adaptations may be made thereto, without departing from the spirit of the invention, in the detail construction (the hydraulic pressure circuit and the like), shape, type and the like.

What is claimed is:

1. An injection molding method for injecting resin into a mold by means of an injection barrel cylinder having a pushing-out member movable therein, said method comprising the steps of:

calculating a stroke length of the pushing-out member from a retracted position to a maximum forward position where the pushing-out member bottoms out against the injection barrel cylinder;

retracting the pushing-out member by said stroke length to the retracted position to fill the injection barrel cylinder with a measured amount of resin; and advancing the pushing-out member to the maximum forward position where the pushing-out member bottoms out against the injection barrel cylinder to thereby inject the measured amount of resin into the mold.

2. The injection molding method according to claim 1, wherein said step of calculating a stroke length of the pushing-out member includes the steps of:

calculating a back pressure measuring stroke during which an essentially constant back pressure is applied to the pushing-out member;

calculating a decompression stroke during which the back pressure is reduced to zero; and adding the back pressure measuring stroke with the decompression stroke to produce said stroke length of the pushing-out member.

3. The injection molding method according to claim 2, wherein the pushing-out member is an injection plunger in a preplasticating injection molding machine.

4. The injection molding method according to claim 3, further comprising the step of allowing a resin pressure within the mold to immediately begin decreasing when said pushing-out member reaches the maximum forward position.

5. The injection molding method according to claim 2, wherein the pushing-out member is a screw in an in-line screw injection molding machine.

6. The injection molding method according to claim 5, further comprising the step of allowing a resin pressure within the mold to immediately begin decreasing when said pushing-out member reaches the maximum forward position.

7. The injection molding method according to claim 2, further comprising the step of allowing a resin pressure within the mold to immediately begin decreasing when said pushing-out member reaches the maximum forward position.

8. The injection molding method according to claim 1, wherein the pushing-out member is an injection plunger in a preplasticating injection molding machine.

9. The injection molding method according to claim 8, further comprising the step of allowing a resin pressure within the mold to immediately begin decreasing when said pushing-out member reaches the maximum forward position.

10. The injection molding method according to claim 1, wherein the pushing-out member is a screw in an in-line screw injection molding machine.

11. The injection molding method according to claim 10, further comprising the step of allowing a resin pressure within the mold to immediately begin decreasing when said pushing-out member reaches the maximum forward position.

12. The injection molding method according to claim 1, further comprising the step of allowing a resin pressure within the mold to immediately begin decreasing when said pushing-out member reaches the maximum forward position.

* * * * *